United States Patent Office 3,381,723
Patented May 7, 1968

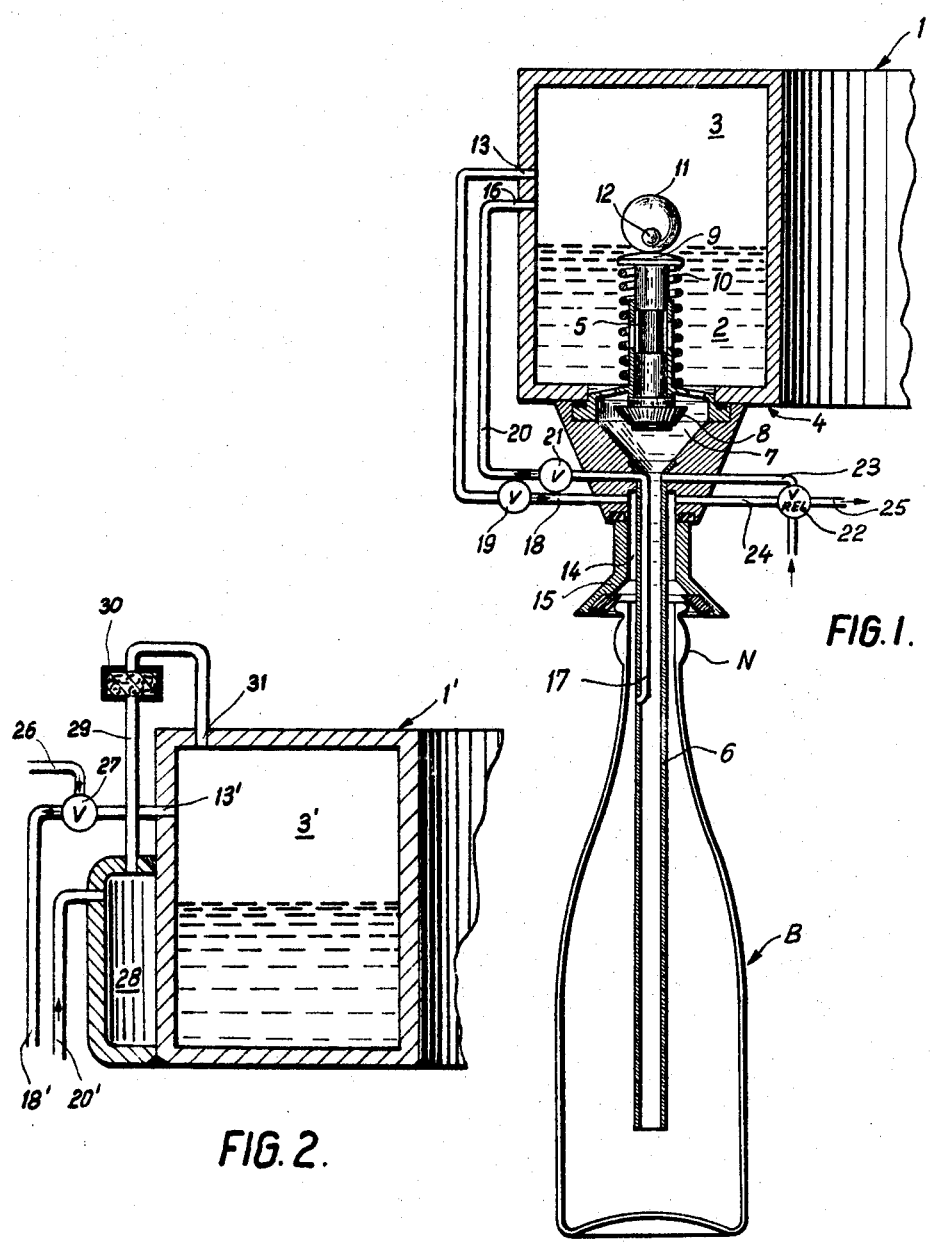

3,381,723
APPARATUS FOR FILLING BEER
BOTTLES AND THE LIKE
Karl Quest, Dortmund, Germany, assignor to Holstein
and Kappert Maschinenfabrik Phonix G.m.b.H., Dortmund, Germany
Filed Dec. 10, 1965, Ser. No. 512,995
5 Claims. (Cl. 141—39)

ABSTRACT OF THE DISCLOSURE

A filling apparatus having a tank containing a supply of carbonated liquid, a cushion of compressed gas above the liquid, and a downwardly extending fill tube receivable in an empty container. Diverse fluid flow conduits having valves and communicating with the space above the liquid level in the tank to relieve turbulence throughout the filling cycle.

---

The present invention relates to a method and apparatus for transferring beer and other carbonated liquids from a source into bottles or other types of containers. More particularly, the invention relates to an improved method and apparatus for filling beer bottles or the like by gravity flow while the supply of beer in a tank or another suitable source is subjected to the pressure of a compressed gas.

It is already known to fill beer bottles by means of an apparatus wherein a filling tube extends downwardly from a beer tank, wherein the interior of the bottle is sealed from the atmosphere during filling, and wherein the interior of the bottle communicates with the space above the liquid level in the tank so that, during filling, the pressure prevailing in the bottle equals the pressure which prevails in the tank whereby the liquid can descend by gravity flow. That liquid which is contained in the filling tube is caused to enter the partially filled bottle by connecting the gas-filled space above the liquid level in the bottle with the filling tube before the top of the bottle is unsealed, i.e., before the pressure in the interior of the bottle is reduced by allowing compressed gas above the liquid level to escape into the atmosphere. At the same time, some liquid will descend from a return conduit which connects the gas-filled portion of the beer tank with the interior of the bottle. The bottle is unsealed subsequent to such evacuation of the filling tube and partial evacuation of the return conduit. The remainder of liquid which is contained in the return conduit is injected under pressure into the next empty bottle or is injected under pressure into the tank. Such forcible evacuation of the return conduit is highly undesirable because, if the liquid is injected into the next empty bottle, it can cause turbulence in the interior of such bottle and prevents proper filling. On the other hand, if the liquid which has remained in the return conduit is forcibly injected into the tank, it will cause turbulence in the main supply of liquid and will again interfere with proper operation of the filling apparatus.

Accordingly, it is an important object of the present invention to provide a novel method of introducing carbonated liquids from a source into an empty container in such a way that the filling tube may be evacuated simultaneously with a reduction in gas pressure above the liquid level in the filled container and that any liquid which remains in the return conduit subsequent to completion of a filling operation is prevented from directly penetrating into the main supply or from being forcibly injected into the next empty container.

Another object of the invention is to provide a method of the just outlined characteristics according to which any liquid which has remained in the aforementioned return conduit upon completion of a filling operation will be allowed to flow by gravity into the next container so that the turbulence caused by such liquid is negligible.

A further object of the invention is to provide a method of filling beer bottles or analogous containers with a carbonated liquid according to which the expulsion of liquid from the return conduit may be carried out in such a way that the liquid cannot penetrate into the next empty container and that the liquid is also prevented from penetrating into the main supply of liquid whereby such remaining liquid cannot cause any turbulence and cannot adversely affect the next filling operation or operations.

Still another object of the invention is to provide a very simple, compact and rugged apparatus which may be used in carrying out the above outlined method and to construct the apparatus in such a way that all of its movable parts may be operated by remote control and in a fully automatic way.

Briefly stated, one feature of my present invention resides in the provision of a method of transferring beer or another carbonated liquid from a source (e.g., a beer tank), wherein a supply of liquid is maintained under compression by a cushion of compressed gas which fills the tank above the liquid level, and through the tops of bottles or similar containers which receive liquid by gravity flow through a normally closed passage defined by a filling tube which extends downwardly from the source. The method comprises the steps of sealing an empty container from the atmosphere and placing the thus sealed container below the source so that the aforementioned passage extends through the top and into the interior of the container, establishing two normally closed paths for the flow of compressed gas between the cushion and the interior of the sealed container (for example, by resorting to a supply conduit which discharges into the container exteriorly of the filling tube and to a return conduit which discharges into an internal channel of the filling tube), temporarily opening one of the paths (the supply conduit) to raise the pressure in the container so that such pressure equals the pressure of the cushion, opening the passage to permit gravity flow of liquid from the source, through the filling tube and into the container, opening the other path while the passage is open to insure that the liquid which partially fills the container also rises in the second path substantially to the liquid level in the source, closing the passage and the other path, connecting the passage and the container above the liquid level therein with the atmosphere whereby any such liquid which remains in the passage descends by gravity flow and fills the container to a desired level, and removing the thus filled container while a column of liquid remains in the second path.

In accordance with a first embodiment of my method, the filled container is replaced with a second empty container and the liquid column is allowed to descend into the second container in response to opening of the two paths while the second container is sealed from the atmosphere. This will be readily understood since, when the two paths communicate with the interior of the empty container and with the interior of the source, the pressure in the two paths is the same and the liquid column automatically descends by gravity flow.

Alternatively, the method may be carried out by resorting to an apparatus wherein the source includes a chamber which communicates with the cushion but is separated from the supply of liquid in the source and wherein the other path (return conduit) connects to the chamber. The filled container is then replaced with a second empty container and the one path is connected with a source of gas whose pressure exceeds the pressure of the cushion. The source of such highly compressed gas is sealed from the cushion, for example, by resorting to a one-way valve in the supply conduit. When the two paths are thereupon opened to connect the source of gas with the interior of the second container and to allow for flow of liquid between the interior of the container and the chamber, the liquid column is automatically expelled from the second path and enters the chamber because the pressure which then prevails in the container exceeds the pressure which prevails in the chamber and in the source. The gas which enters the chamber may be admitted into the cushion by flowing through a suitable filter. It is clear that the source of gas under high compression may be directly connected with the second container, i.e., such highly compressed gas need not necessarily flow through the supply conduit.

The novel features which are considered as characteristic of the invention are set forth in particular in the appended claims. The improved filling apparatus itself, however, both as to its construction and the mode of operating the same, together with additional features and advantages thereof, will be best understood upon perusal of the following detailed description of certain specific embodiments with reference to the acompanying drawings, in which:

FIG. 1 is a somewhat schematic fragmentary vertical sectional view of an apparatus which embodies one form of the present invention and which is used for filling of beer bottles; and FIG. 2 is a similar fragmentary sectional view of a slightly modified apparatus.

Referring first to FIG. 1, there is shown an apparatus which comprises a source of carbonated liquid here shown as an annular tank 1 the lower portion 2 of which contains a supply of carbonated liquid, for example, beer. The upper portion 3 of the tank 1 is filled with a compressed gas which constitutes a cushion and maintains the supply of beer under requisite compression.

The bottom wall 4 of the tank 1 is provided with a plurality of outlets 7 (only one shown) each of which constitutes a seat for a valve member 8. The stem 5 of the valve member 8 is connected to a carrier or bridge 9 which is biased by a prestressed helical spring 10 tending to move the valve member 8 away from the internal surface of the outlet 7 and to thereby provide a clearance for escape of beer from the lower portion 2 of the tank 1 into a vertical passage defined by a filling tube 6 connected to and extending downwardly from the outlet 7. The upper side of the carrier 9 is engaged by an eccentric cam disk 11 which is mounted on a cam shaft 12 and is located in the interior of the tank 1. The control mechanism which rotates the cam shaft 12 at predetermined intervals (i.e., in synchronism with operation of the conveyor which supplies empty beer bottles B) is known in the art and is not shown in the drawings.

The gas-filled upper portion 3 of the tank 1 is connected with a supply conduit 18 and a return conduit 20. The supply conduit 18, whose intake end is connected to a first nipple 13, contains a normally closed shutoff valve 19 and discharges into a combined sealing and centering device 15 which resembles a bell and is applied over the open top of the bottle B when the latter assumes its filling positions. The bell 15 is provided with grooves 14 which surround the filling tube 6, and the supply conduit 18 discharges into one of the grooves 14. This bell 15 is slidable along the filling tube 6 between a lower (sealing) position and an upper (idle) position.

The filling tube 6 is formed with an internal channel 17 which extends from a level above the bell 15 to a level below the neck portion N of the bottle B, and the upper end of this channel 17 is connected with the discharge end of the return conduit 20. The intake end of the conduit 20 is connected with a second nipple 16 and this conduit also contains a normally closed shutoff valve 21.

The apparatus further comprises a relief valve 22 which can connect a conduit 23 with a conduit 24 and which is further provided with a vent pipe 25. The conduit 23 communicates with the outlet 7 and the conduit 24 communicates with at least one of the grooves 14 in the bell 15.

The apparatus which is shown in FIG. 1 operates as follows:

A bottle B is moved to the filling position of FIG. 1 and the bell 15 is applied over the open top of the neck portion N whereby the filling tube 6 extends close to the bottom wall of the bottle. The valve 19 is thereupon opened, preferably by remote control, so that a stream of compressed gas can flow in the path defined by the supply conduit 18 from the upper portion 3 of the tank 1, through one or more grooves 14 of the bell 15, and into the interior of the bottle B. Thus, the pressure which prevails in the bottle B corresponds to the pressure of the cushion above the liquid level in the tank 1. In the next step, the valve 21 is opened to connect the upper tank portion 3 with the channel 17 through the path defined by the return conduit 20 whereby the liquid column which has risen in the conduit 20 in the course of the preceding filling operation is caused to flow by gravity, and without creating any appreciable turbulence, into the filling tube 6 and thence into the bottle B. The valve 19 is thereupon closed and the shaft 12 is rotated to move the cam 11 to the angular position of FIG. 1 in which the spring 10 compels the valve member 8 to move away from its seat and the outlet 7 allows beer to flow by gravity from the lower tank portion 2, through the passage defined by the filling tube 6, and into the bottle B. The liquid rises in the tube 6 and enters the channel 17 to fill the return conduit 20 up to the level of liquid in the lower tank portion 2. In the next-following step, the shaft 12 is rotated again to move the valve member 8 to sealing position, and the valve 21 is closed. The relief valve 22 is thereupon opened to connect the vent pipe 25 with the conduit 24 whereby the pressure above the liquid level in the bottle B drops and the liquid escapes from the filling tube 6. In the final step, the bottle B is removed and is replaced by an empty bottle.

FIG. 2 shows a portion of a modified annular tank 1'. The supply conduit 18' is connected with a pressure conduit 26 which can admit a highly compressed gas into a groove 14 (not shown in FIG. 1) but not into the upper tank portion 3'. That portion of the supply conduit 18' which extends between the nipple 13' and the connection with the pressure conduit 26 accommodates a one-way valve 27. The return conduit 20' does not communicate directly with the upper tank portion 3' but rather with a chamber 28 which forms an annulus about the periphery of the main portion of the tank 1'. A further conduit 29 connects the chamber 28 with a nipple 31 provided on the top wall of the tank 1', and the conduit 29 accommodates a suitable filter 30.

The chamber 28 receives the liquid column which remains in the path defined by the return conduit 20' when a filled bottle is removed from the filling station. Thus, such liquid column is not discharged into the next empty bottle. The pressure of gas in the conduit 26 exceeds the pressure of gas cushion in the upper tank portion 3' so that, when the valves 19, 21 are open, the liquid column contained in the return conduit 20' is expelled into the chamber 28. The gas which enters the chamber 28 flows through the conduit 29 and filter 30 to enter the upper tank portion 3'.

In conventional filling apparatus, the liquid which is contained in the filling tube 6 below the valve member 8 is caused to flow into a partially filled bottle before the latter is unsealed. Such method of filling requires more time because the evacuation of the filling tube precedes the unsealing of the bottle. Also, the evacuation of the liquid column from the path defined by the return conduit 18 or 18' of my apparatus can take place by gravity flow (FIG. 1) into a chamber 28 which is separated from the main supply of liquid in the tank 1' (FIG. 2).

Without further analysis, the foregoing will so fully reveal the gist of the present invention that others can, by applying current knowledge, readily adapt it for various applications without omitting features which fairly constitute essential characteristics of the generic and specific aspects of my contribution to the art, and, therefore, such adaptations should and are intended to be comprehended within the meaning and range of equivalence of the following claims.

What is claimed as new and desired to be protected by Letters Patent is:

1. An apparatus for filling bottles or similar containers with carbonated liquids, comprising a tank arranged to contain a supply of carbonated liquid and a cushion of compressed gas above the liquid, said tank having a downwardly extending filling tube receivable in an empty container and a normally closed first valve for controlling the outflow of liquid through said tube; a hollow sealing member surrounding said tube and arranged to be sealingly applied over the top of a container; a supply conduit connecting said cushion with the interior of said hollow sealing member; a normally closed second valve provided in said supply conduit for regulating the flow of compressed gas from the interior of said tank through said sealing member and into a container whose top is sealed by said member; a return conduit connecting said cushion with the interior of the container beneath the top thereof when the top of said container is applied against said sealing member; a normally closed third valve provided in said return conduit for regulating the flow of compressed gas between the interior of said tank and said container; and a relief valve arranged to connect the interior of said tube and the upper part of a container with the atmosphere.

2. An apparatus as set forth in claim 1, wherein said filling tube is provided with an internal channel forming part of said return conduit.

3. An apparatus as set forth in claim 1, wherein said tank comprises a chamber which is separated from said supply of liquid and wherein said return conduit communicates with said cushion through said chamber.

4. An apparatus as set forth in claim 3, further comprising a pressure conduit arranged to admit into a sealed container a gas whose pressure exceeds the pressure of said cushion so that, when said third valve is open and said pressure conduit admits gas into a sealed container, any liquid contained in said return conduit is expelled into said chamber.

5. An apparatus as set forth in claim 4, wherein said pressure conduit discharges into said supply conduit and further comprising one-way valve means provided in said supply conduit for preventing entry of gas which issues from said pressure conduit into said tank.

References Cited

UNITED STATES PATENTS 1,985,355    12/1934    Stern _____ 141—55

LAVERNE D. GEIGER, *Primary Examiner.*

HOUSTON S. BELL, JR., *Examiner.*